T. S. COFFIN.
Lifter for Kitchen Use.
No. 99,061.  Patented Jan. 25, 1870.
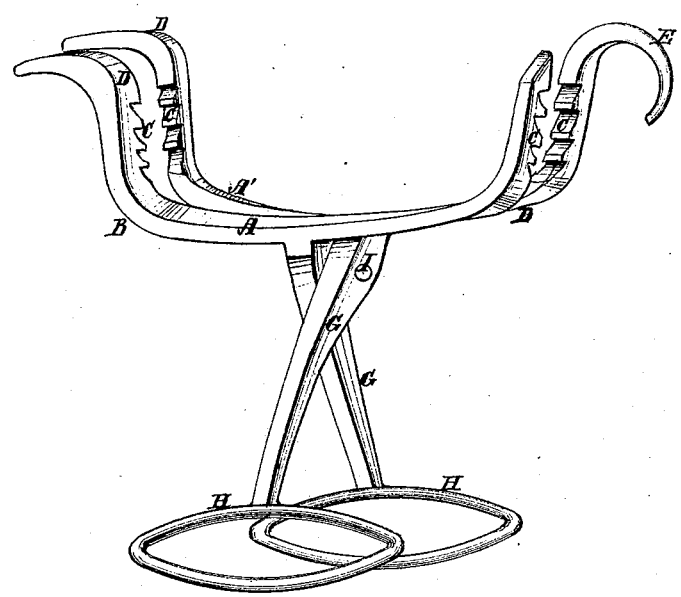

United States Patent Office.

T. S. COFFIN, OF HARRINGTON, MAINE.

Letters Patent No. 99,061, dated January 25, 1870.

LIFTER FOR KITCHEN-USE.

The Schedule referred to in these Letters Patent and making part of the same.

*To all whom it may concern:*

Be it known that I, T. S. COFFIN, of Harrington, in the county of Washington, and State of Maine, have invented a new and improved Lifter for Kitchen Use; and I do hereby declare that the following is a full, clear, and exact description thereof, which will enable others skilled in the art to make and use the same, reference being had to the accompanying drawings, forming part of this specification.

This invention relates to improvements in lifters for kitchen use, and consists of a pair of lifting-jaws with handles crossing each other, and pivoted together, the said jaws being arranged in a peculiar way for use as a stove-cover lifter, a hook for lifting lids, taking hold of bails, or for use as clamps for holding rods, pipes, or other articles for filing, and other like operations.

The drawing represents a perspective view of my improved lifter.

The jaws A A', consisting of long bars of metal, connected to the handles transversely thereof, at their centres, extend for a considerable distance, at right angles, or nearly so, and are then bent at B, from the handles, in lines nearly parallel therewith, along which they extend a short distance, and are notched, as at C, in the faces fronting each other.

Beyond these notched parts they turn outward at the end D, and assume the form of stove-cover lifter-points, and at the opposite side the jaw A terminates, while the other curves, as at E, and assumes the form of a hook for lifting pot-lids with rings or eyes, and other like articles.

The parts having the notches C are useful for taking the bails of pots, the edges of pans, and for many other applications, as pipe-tongs or holding articles to be filed or hammered.

The shanks G G have handles H, and are pivoted, at I, in the manner of ice-tongs, and other like articles.

Having thus described my invention,

I claim as new, and desire to secure by Letters Patent—

The lifter, consisting of the toothed jaws A and A', the latter having the hook E, when formed on the shanks G G, at right angles thereto, curved at B, and bent outwardly, and pointed at the ends D, as shown and described, whereby it is adapted to operate as specified.

T. S. COFFIN.

Witnesses:
C. E. LEIGHTON,
J. A. COFFIN.